United States Patent [19]

Payne et al.

[11] 4,430,695
[45] Feb. 7, 1984

[54] VISUAL LANDING AIDS FOR AIRCRAFT

[75] Inventors: Robert M. Payne; Christopher A. R. Haire, both of London, England

[73] Assignee: Research Engineers Limited, England

[21] Appl. No.: 242,319

[22] Filed: Mar. 10, 1981

[30] Foreign Application Priority Data

Mar. 11, 1980 [GB] United Kingdom ............... 8008191

[51] Int. Cl.³ .............................................. G01B 9/08
[52] U.S. Cl. .................................. 362/277; 362/240; 362/231; 362/293; 340/954; 356/6; 356/18; 356/391
[58] Field of Search ................... 362/2, 231, 240, 277, 362/293, 362, 375; 340/26, 27 AT; 356/6, 18, 391

[56] References Cited

U.S. PATENT DOCUMENTS 2,549,860 4/1951 Swanson ............................. 340/26
3,012,224 12/1961 Ferguson ............................ 340/26

FOREIGN PATENT DOCUMENTS 1369376 4/1971 United Kingdom .
1389681 5/1973 United Kingdom .
1540725 5/1976 United Kingdom .
1511558 7/1976 United Kingdom .

Primary Examiner—Donald P. Walsh

[57] ABSTRACT

Apparatus for aligning an aircraft landing aid projector of the type which comprises a light source located at the focus of a parabolic reflector, a lens mounted coaxially with the parabolic reflector and a filter disposed intermediate the reflector and lens close to the focal point of the lens. The apparatus comprises a base having a surface portion for supporting a projector, a lens for focussing light from the projector onto an image receiving means and means allowing observation of the image receiving means. The filter of a projector is correctly positioned when it appears in focus on the image receiving means.

14 Claims, 8 Drawing Figures

VISUAL LANDING AIDS FOR AIRCRAFT

DESCRIPTION

BACKGROUND OF THE INVENTION

This invention relates to a visual landing aid for aircraft. In particular it relates to apparatus for use in aligning a projector of a visual landing aid.

A visual landing aid known as the visual approach slope indicator is designed to provide the pilot of an aircraft with a visual indication that he is approaching a runway along the correct path. The slope indicator comprises a number of units each of which is arranged to direct a beam of light along the approach path of an aircraft. The light beam emitted by each unit is a composite one; when it is viewed from above a certain angle of elevation it appears white while when it is viewed from below that elevation angle it appears red. There should be a sharp transition between the red and white at the particular elevation angle. The angle at which the transition occurs is set to that at which an aircraft should be approaching the runway. In one form of slope indicator two such units are located one behind the other on each side of the runway. When the aircraft is approaching the runway at the correct angle the pilot sees the forward unit as white and the rear unit as red. If the aircraft is approaching too low the pilot sees both units as red and immediately has a warning that he is undershooting. If he is too high both units appear white.

In an alternative arrangement a number of units are located in side by side relationship on one or both sides of the runway. Each unit of a group on one side of the runway is arranged such that the elevation angle at which transition from white to red occurs is slightly different from the other units. For example, for an approach angle of 3° the unit closest to the runway can be set at an angle of 3°30', the next unit at an angle of 3°10', the next unit at an angle of 2°50' and the next at an angle of 2°30'. When the aircraft is approaching at the correct angle the pilot will see the two units closest to the runway as red and the outer two units as white.

Originally each unit comprised a housing containing a light source arranged at the focus of a parabolic reflector. Light from the source was reflected by the parabolic reflector through a slit in the front of the housing. A red filter was located in the light beam to provide the composite red and white beam. Subsequently projection units have been designed to provide improved beams. The projection units comprise a light source located at the focus of a parabolic reflector, a lens mounted coaxially with the parabolic reflector and a filter, typically a red passing filter, disposed intermediate the reflector and the lens, the filter being close to the focal point of the lens and terminating on the axis of the reflector and lens. Such a projector will hereinafter be called a projector of the type referred to.

It is important that there is a sharp transition between the red and white in order that the pilot may accurately position the aircraft on the correct approach path. A small variation in the angle of approach can translate into a considerable variation in touch down point along the runway.

It has been found by experiment that to obtain the sharpest transition between red and white portions of the beam, the optimum position of the filter relative to the lens is not, as would be expected, precisely at the focal point of the lens but at a position slightly closer to the lens than the focal point. This position is generally found empirically but this is inconvenient since the projector has to be viewed from a considerable distance. The present invention is concerned with a technique which enables the filter of the projector to be set to the optimum position more conveniently. This involves use of an apparatus which comprises a base having a surface porition for supporting a projector, a lens arranged to focus light from the projector onto an image receiving means and means allowing observation of the image receiving means.

BRIEF SUMMARY OF THE INVENTION

According to one aspect of the present invention there is provided apparatus for use in aligning a projector of the type referred to, said apparatus comprising a base having a surface portion for supporting a projector, focussing means for focussing light from said projector onto an image receiving means, and means allowing observation of the image receiving means.

The image receiving means may be a sheet of ground glass which is spaced axially from the focussing means such that the image of a projector filter on the glass sheet is in focus when the projector filter is at its optimum position.

The focussing means and the image receiving means may be mounted within a housing on said base and said observation allowing means includes a light reflecting member disposed beyond said image receiving means and arranged to reflect light from the image receiving means through a window in a wall of the housing.

A lens may be disposed between the light reflecting member and the window. The glass sheet may have a calibration or calibrations which can be used to position the filter both axially and in elevation. The glass sheet may be so formed that the image of the filter is visible at two regions laterally spaced from the central part thereof.

According to another aspect of the present invention there is provided a method of aligning a projector of the type referred to using an apparatus according to the one aspect comprising locating said projector on said surface portion of the base, energizing the light source of the projector, and adjusting the position of the projector filter unit it appears in focus on said image receiving means. The method may include the step of initially setting the position of said image receiving means using a previously aligned projector by adjusting the position of said image receiving means until an image of the filter of the aligned projector is focussed on the image receiving means.

The present invention provides a simple technique for adjusting a projector and allows a projector to be set up completely for operation in a workshop.

BRIEF DESCRIPTION OF THE DRAWING

The invention will be described now by way of example only with particular reference to the accompanying drawings. In the drawings.

DETAILED DESCRIPTION OF THE PREFERRED EMBODIMENTS

Figure 1:
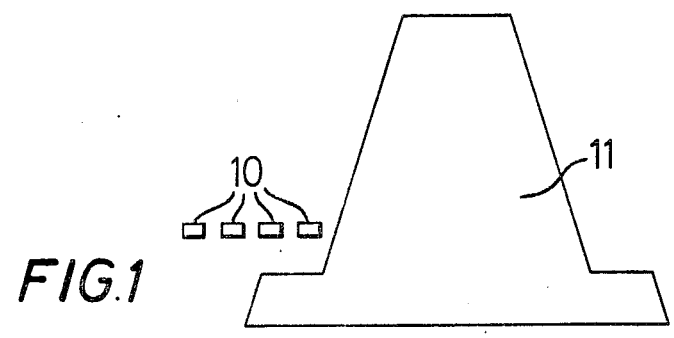
FIG. 1 is a schematic illustration of a visual approach slope indicator arrangement.
Figure 2:
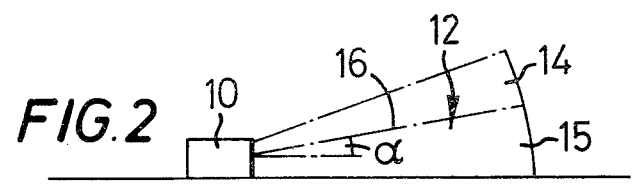
FIG. 2 is a side schematic elevation illustrating a unit used in such an arrangement.

Referring to FIGS. 1 and 2 a visual slope approach indicator arrangement comprises a number of units 10 located on one side of a runway 11. As shown in FIG. 2 each unit 10 is arranged to emit a beam of light 12. The beam 12 comprises two portions, a white portion 14, and a red portion 15. The junction 16 of the white and red portions should be as sharp as possible and extends along the line which is at an angle $\alpha$ to the horizontal. When the unit 10 is viewed from above the line 16 an observer sees only white while if it is viewed from below the line 16 the observer sees only red.

In the arrangement shown in FIG. 1 the units 10 are set such that the angles of each unit vary from one to the next. For example, assuming that an aircraft should approach the runway 11 at a glide angle of 3°, the unit closest to the runway can be set so that its angle $\alpha$ is 3°30′, the next one so that $\alpha$ is 3°10′, the next $\alpha = 2°50′$ and the outer one with $\alpha = 2°30′$. Thus if the pilot is approaching along the correct glide path the two units closest to the runway will appear red while those furthest away from the runway will appear white. If the pilot is too low all units will appear red, while if he is too high all units will appear white. Thus by observing the units 10 the pilot can set the aircraft on the correct approach path.

Figure 3:
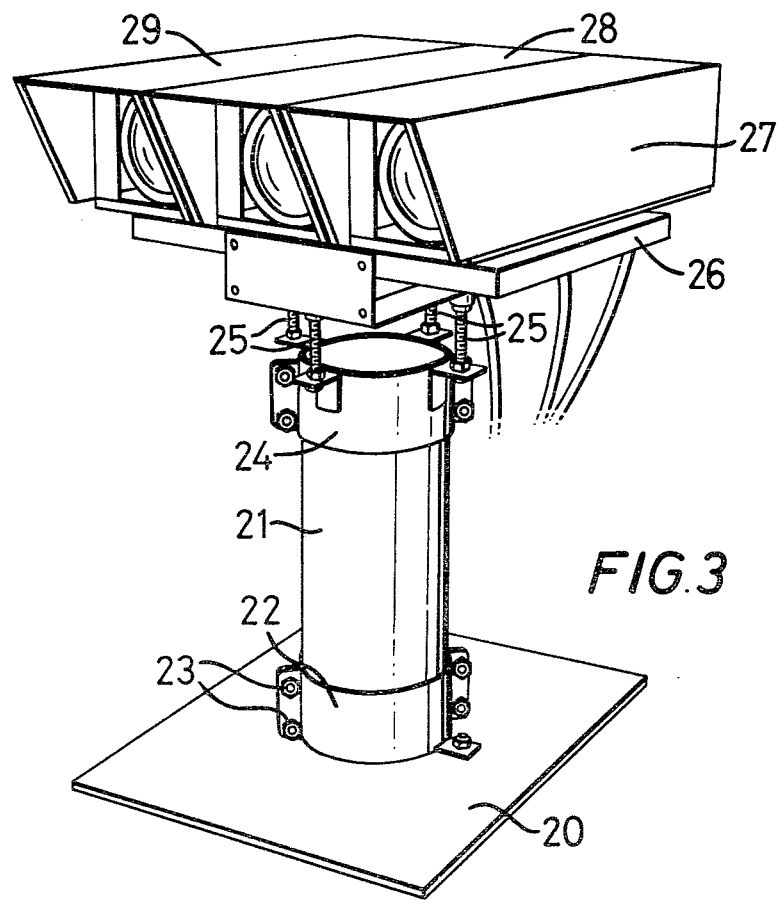
FIG. 3 is a perspective view of a unit which incorporates three projectors.

Referring now to FIG. 3 of the drawings a unit 10 comprises a base plate 20 which is arranged to be secured to the ground at the side of a runway so that its surface is horizontal. A tube 21 made of glass reinforced plastics is mounted on the plate 20 and clamped thereto by means of a collar 22 and bolts 23. A similar collar 24 is clamped to the upper end of the tube 21 and carries four upwardly extending bolts 25 which are equally spaced around the circumference of the upper end of the tube 21. The bolts support a platform 26 which carries three projectors 27, 28, 29. The platform 26 includes a levelling arrangement which enables the surface of the platform to be set so that it is inclined to the horizontal at a selected angle, this angle corresponding generally to the angle $\alpha$ shown in FIG. 2. This angle is set with or without the projectors in position with the aid of a clinometer in a conventional manner. As will be seen from the subsequent description, each projector can be pre-set during assembly so that it can be mounted on the platform 26 without any adjustment being required. Once the platform 26 has been mounted at the correct angle, projectors can be removed and replaced for maintenance purposes without a requirement for on-site adjustment.

Figure 4:
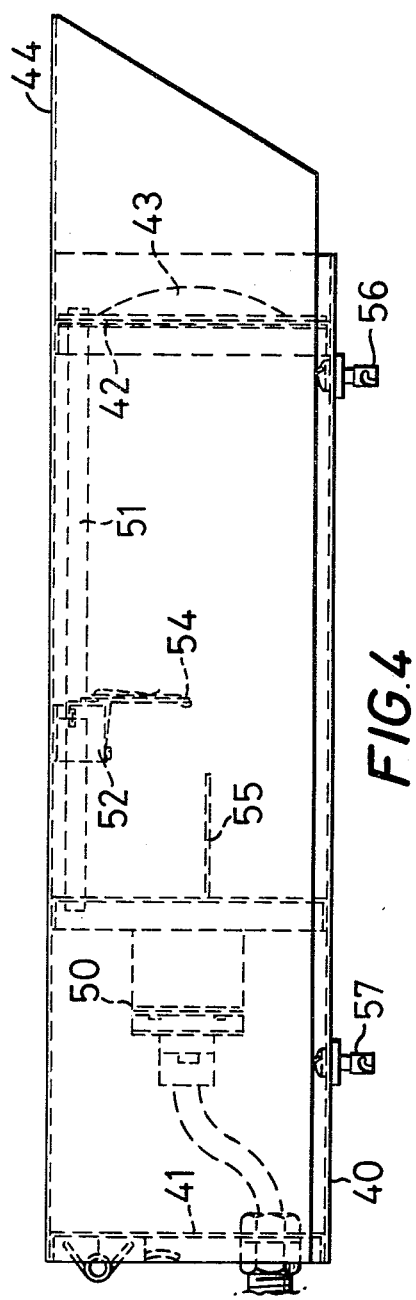
FIG. 4 is a side sectional view of a projector used in the unit of FIG. 3.
Figure 5:
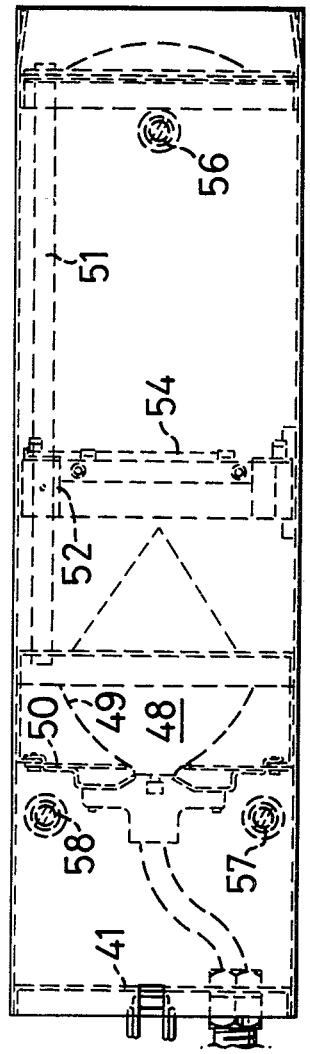
FIG. 5 is a plan view of the projector of FIG. 4 with the cover removed.

Referring now to FIGS. 4 and 5 a projector comprises an elongate channel-shaped housing 40 which is closed at its rear by an end plate 41. The front of the housing is closed by a lens mounting 42 which carries a lens 43. The housing 40 has a removable cover 44 which projects beyond the front of the housing.

A light source and reflector assembly 48 is mounted towards the rear of the housing 40 at a position spaced from the end plate 41. The assembly 48 includes a parabolic reflector 49 which is supported between the sides of the housing 40 by a mounting arrangement 50. The reflector 49 is mounted such that it is coaxial with the axis of the lens 47. A light source (not shown) is mounted at the focus of the reflector 49.

A cylindrical bar 51 extends between the mounting arrangement 50 and the lens mounting 42 adjacent the upper edge of one side wall of the housing 40. The bar 51 forms a support for one end of a carrier 52 which extends across the upper part of the housing 40 such that its opposite end rests on the upper edge of the opposite wall of the housing. The carrier 52 is mounted such that it can slide longitudinally along the housing 40. The carrier supports a rectangular filter 54 which is disposed in a plane at right angles to the longitudinal axis of the housing 40. The filter 54 depends downwardly from the carrier 52 and is disposed such that its bottom edge is co-planar with the axis of the lens 43 and reflector 49. The carrier 52 includes adjusting means which permit adjustment of the vertical position of the filter 54 so that its bottom edge can be set on the axis of the lens 47.

Mounted between the reflector 49 and the filter 54 is a triangular plate 55. The plate is arranged parallel to but spaced from the plane containing the bottom edge of the filter 54 and on the opposite side of that plane to the filter 54.

The base of the housing 40 carries three feet members 56, 57, 58 which are arranged at the apices of an isosceles triangle. The feet members are arranged such that their bases lie in the same plane.

In operation when the lamp of the projector is energized and the filter 54 correctly positioned, the lens produces a beam of light in which the portion below the axis of the lens appears red while the portion above that axis appears white. It has been found that the optimum position for the filter 54 is close to the focus of the lens 43 but displaced therefrom slightly towards the lens. The plate 55 is provided since it has been found that the provision of this plate enhances the sharpness of the transition between the red and white portions of the projected beam. Various shapes of plate have been investigated and it has been found that the optimum position and shape is that shown in FIGS. 4 and 5. It is believed that the plate acts as a light shield to reduce the amount of white light which spills over the red part of the projected filter image.

In the past, there has been no convenient, simple and reliable method of setting the filter 54 at its optimum position. One method is to view the light beam projected by the projector from a distance and to adjust the filter until the transition between the red and white portions of the beam is the sharpest. However this is inconvenient since viewing has to take place at a considerable distance and makes communication between the observer and the adjuster difficult. We have developed a simple apparatus which enables the filter 54 to be positioned quickly and accurately in a workshop.

Figure 6:
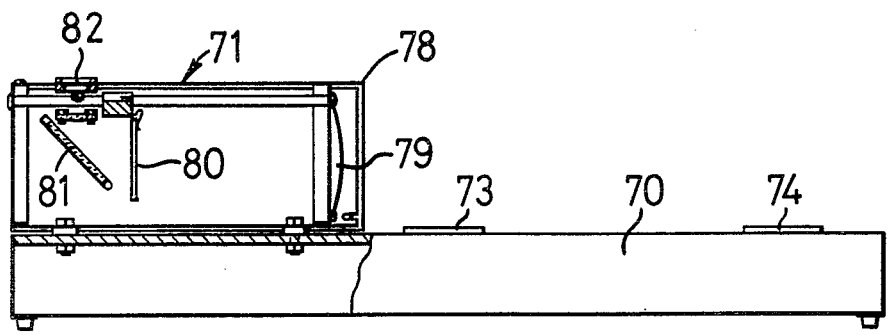
FIG. 6 is a side elevation partly in section of apparatus for use in adjusting a projector.
Figure 7:
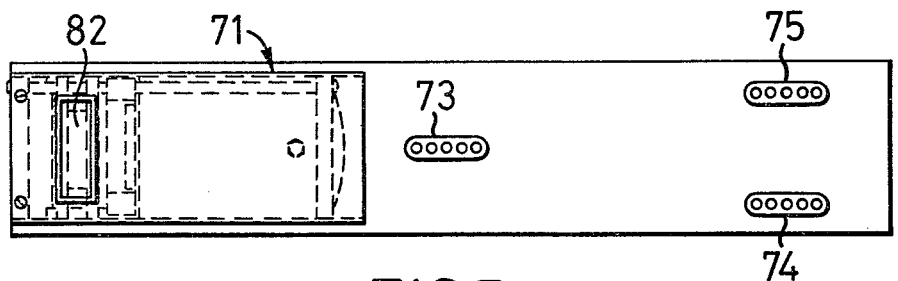
FIG. 7 is a plan view of the apparatus of FIG. 6.

This apparatus is illustrated in FIGS. 6 and 7. The apparatus comprises an accurately machined base 70. One end portion of the surface of the base supports a collimator arrangement 71 and the remainder of the base provides a support surface for a projector. This remaining portion of the surface of the base has three slightly raised portions 73, 74, 75, the surfaces of which are accurately co-planar and arranged to receive the three feet members 56, 57, 58 of a projector.

The collimator arrangement 71 has a housing 78 which supports towards its front end a lens 79. Spaced from the lens and movable axially relative thereto is a ground glass screen 80. Located behind the ground glass screen 80 is a mirror 81 which is disposed at 45° to the axis of the housing 78. The upper wall of the housing 78 has a window 82 which is disposed above the mirror 81 and a lens is interposed between the mirror and window to allow a magnified view of the ground glass screen to be seen by an observer looking through the window 82. The ground glass screen has a graticule formed thereon.

Figure 8:
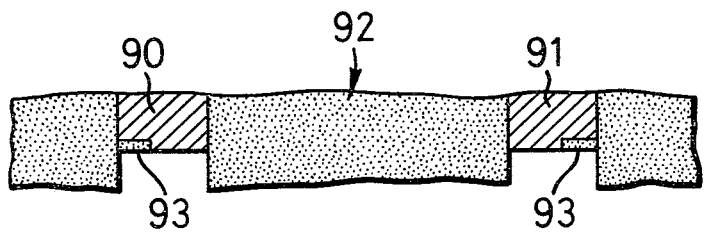
FIG. 8 illustrates the image of a projector filter seen when using the apparatus of FIGS. 6 and 7.

The ground glass screen 80 is preferably darkened as shown in FIG. 8 so that it is transparent only at two areas 90, 91 on either side of the center 92. The screen 80 also includes a transverse graticule line 93 which is used to set the vertical position of the filter.

The position of the ground glass screen 80 relative to the lens 79 is set using a projector which has had its filter 54 accurately positioned, for example by viewing the projected light beam of the projector from a distance as described above. The projector is located on the base 70 so that its feet sit on the surfaces 73, 74, 75. Light is projected from the projector into the collimator and the ground glass screen is moved until the image of the projector filter is focused on that screen as viewed through the window 82 at the areas 90, 91. The screen 80 is also adjusted so that the lower horizontal edge of the filter 54 as seen in the image coincides with the selected line 93 of the screen graticule. The ground glass screen 80 is fixed in that position. Provided this first projector has had its filter set to the optimum position any other projector can now be adjusted using the collimator in the following manner. A projector to be adjusted is placed on the surfaces 73, 74, 75 with its cover removed and its lamp energized so that light enters the collimator. The filter 54 of the projector 10 is moved axially until its image is focused on the ground glass screen 80 as viewed through the window 82. This will occur when the filter 54 and the screen 80 are located at points conjugate to one another. The filter 54 is also adjusted so that the image of its bottom edge coincides with the selected graticule line 93. The filter is now at the optimum position to produce the sharpest transition between the red and white portions of the projected beam. Thus, it will be seen that the apparatus shown in FIGS. 6 and 7 provides an extremely simple means of adjusting the projector to its optimum operating condition prior to mounting it on site at an airfield. The aligning operation can be carried out in a workshop and all that is required at the airfield is to mount the projectors which have been pre-adjusted on the platform 26 as shown in FIG. 3.

We claim:

1. Apparatus for aligning the projector of a visual landing aid for aircraft, wherein that projector includes a filter whose position can be adjusted with respect to the aligning apparatus, the apparatus for aligning comprising:

a base including means for supporting a projector thereon for the projector to shine light toward a focusing means;

image receiving means for receiving an image projected by the projector and passing through said focusing means; the position of the image receiving means being adjustable with respect to the base for initially setting the apparatus;

said focusing means being located between the projector and the image receiving means for focusing the image from the projector onto the image receiving means only when the filter of the projector and the image receiving means of the aligning apparatus are at points conjugate to one another; and means enabling observation of the image receiving means for ascertaining if the image of the filter is focused at the image receiving means.

2. The apparatus of claim 1, wherein the image receiving is light transmissive and is spaced axially from the focusing means.

3. The apparatus of claim 2, wherein the image receiving means comprises a sheet of ground glass.

4. The apparatus of claim 2, wherein the observation enabling means includes a light reflector disposed past the image receiving means, and a viewing window; and the reflector being oriented and arranged for refecting light passing the image receiving means to the window.

5. The apparatus of claim 4, further comprising a housing on the base enclosing and supporting the image receiving means, the reflector and the focusing means, and the housing including an opening for permitting light to pass to the focusing means, and the window also being defined in the housing.

6. The apparatus of claim 4, further comprising a lens between the reflector and the window.

7. The apparatus of claim 2, wherein the image receiving means includes calibration means thereon for determining the position of the image receiving means with respect to the filter in the projector.

8. The apparatus of claim 3, wherein the glass sheet has a less clear central region and has a clearer light transmitting region on each opposite side of the central region, whereby the image of the filter of the projector may be viewed on the glass sheet.

9. The apparatus of claim 8, wherein the image receiving means includes calibration means thereon for determining the position of the image receiving means with respect to the filter in the projector.

10. The apparatus of claim 2, wherein the image receiving means is movable toward and away from the focusing means and along the axis of the focusing means.

11. The apparatus of either of claims 2 or 10, wherein the image receiving means is movable across the axis of the focusing means.

12. Method of aligning a projector in a visual landing aid for aircraft, wherein the projector includes a filter whose position can be adjusted in the projector, the method comprising the steps of:

locating the projector so that light emitted from the projector shines toward an image receiver after passing through a focusing lens associated with the image receiver, said focusing lens causing an image of said filter to come into focus on the image receiver only when the filter and the image receiver are at points conjugate to one another;

observing the image receiver; and adjusting the position of the filter in the projector until the image of the filter on the image receiver appears in focus.

13. The method of claim 12, further comprising initially setting the position of the image receiver by shining light from a projector to the image receiver through a properly prepositioned filter, observing the image receiver and adjusting the position of the image receiver with respect to the filter until the image of the filter on the image receiver is in focus.

14. The method of claim 13, wherein the initial position of the image receiver is set by selectively moving the image receiver toward and away from the filter and also across the axis of the light passing to the image receiver.

* * * * *